UNITED STATES PATENT OFFICE 2,321,305

ACCELERATOR OF VULCANIZATION

William E. Messer, Cheshire, Conn., assignor to United States Rubber Company, New York, N. Y., a corporation of New Jersey No Drawing. Application June 24, 1939, Serial No. 280,929

5 Claims. (Cl. 260—788)

This invention relates to a new class of compounds which have been found valuable as accelerators for the vulcanization of rubber.

The new class of rubber vulcanization accelerators may be represented by the general formula

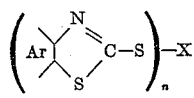

Ar is an arylene group; when $n$ is 1, X is NH-alkyl, NH-aryl, N-diaryl, O-alkyl or O-aryl; when $n$ is 2, X is oxygen, NH, N-alkyl, or N-alicyclic; when $n$ is 3, X is N. Alkyl is intended to include substituted alkyls such as benzyl.

These materials are derivatives of arylene-thiazyl sulfur chloride, wherein the chlorine is replaced by the X radical above, when 1–3 moles of the arylene-thiazyl sulfur chloride is reacted with a mole of ammonia, primary amines, water, alcohols or phenols. During such reaction hydrogen chloride is split off.

In the following illustrative examples, benzothiazyl sulfur chloride is used as the reagent; it may be prepared in solution, for purposes of reaction by passing dry chlorine into a slurry of 1,1' dithio bis benzothiazole in benzene, carbon tetrachloride, etc.

The accelerators are delayed-action accelerators similar in this respect to 1,1' dithio bis benzothiazole itself. Hence they may be used alone or in conjunction with activating more basic nitrogen compounds such as ammonia, amines, guanidines such as diphenyl guanidine, thiuram sulphides such as tetramethyl thiuram monosulfide, etc. They may also, if desired, be used in admixture with other thiazole accelerators such as the mercapto-benzothiazyl sulfides.

The following examples are given to illustrate the invention in which comparison is made with a stock containing 1,1' dithio bis benzothiazole (parts are by weight):

Example I

The reaction product of benzothiazyl sulfur chloride and aniline (N-phenyl benzothiazyl sulfamine).

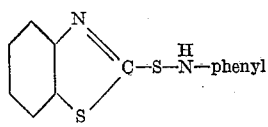

A 66 grams crude 1,1'-dithio bis benzothiazole are stirred with 300 to 600 cc. carbon tetrachloride and dry chlorine passed in until complete solution ensues and about 14.1 grams of chlorine has been absorbed. About 70 ccs. of aniline are then added with stirring and after standing a short while the resulting solution is filtered and the precipitate washed with a little carbon tetrachloride, recovering some 47 grams pure aniline hydrochloride (aniline salt). The carbon tetrachloride filtrates are evaporated to dryness (condensing and recovering carbon tetrachloride used) leaving 105 grams of dark gray, oily crystals. These may be purified by washing with alcohol and drying, thereby obtaining 60 grams of light gray colored crystals, melting at 119–122° C.

B 66 grams of pure 1,1'-dithio bis benzothiazole (made by recrystallizing the product used in A from benzene) are treated in the same way as in A. 52.7 grams pure aniline salt are recovered. 97.5 grams of crude N-phenyl benzothiazyl sulfamine of melting point 114–118° are obtained and this will yield 75.3 grams N-phenyl benzo thiazyl sulfamine melting point 118–120° C. on purification.

The following rubber mixes were made, vulcanized and tested.

| Stock | A | B |
|---|---|---|
| Pale crepe | 100. | 100. |
| Zinc oxide | 10. | 10. |
| Lithopone | 40. | 40. |
| Whiting | 50. | 50. |
| Suprex clay | 25. | 25. |
| Zinc soap of cocoanut oil acids | 1. | 1. |
| Sulfur | 3. | 3. |
| 1,1'-dithio bis benzothiazol | 0.65 | |
| N-phenyl benzo thiazyl sulfamine | | 0.65 |

Tensiles—unaged

| Minutes cure at 30 lbs./sq. in. steam pressure | A | | B | |
|---|---|---|---|---|
| | T | E | T | E |
| 10 | 60 | 953 | 300 | 843 |
| 20 | 400 | 513 | 460 | 666 |
| 30 | 1,860 | 546 | 1,160 | 573 |
| 40 | 2,080 | 626 | 1,860 | 563 |
| 50 | 2,280 | 596 | 2,160 | 636 |

Scorch test

| Minutes cure at 5 lbs./sq. in. steam pressure | A | | B | |
|---|---|---|---|---|
| | T | E | T | E |
| 45 | 132 | 1,330 | 225 | 1,437 |
| 60 | 130 | 1,515 | 200 | 1,280 |
| 75 | 137 | 1,445 | 203 | 1,243 |
| 90 | 155 | 1,337 | 210 | 1,197 |
| 120 | 192 | 1,050 | 215 | 1,107 |
| 150 | 305 | 652 | 247 | 852 |
| 180 | 855 | 577 | 275 | 810 |

T=ultimate tensiles in pounds per square inch.
E=percent elongation at break.

EXAMPLE II

Twenty ccs. liquid ammonia were dissolved in about 300 ccs. carbon tetrachloride and to this solution were added with stirring 150 ccs. carbon tetrachloride solution of 20 grams benzothiazyl sulfur chloride. Carbon tetrachloride solvent was recovered by evaporation and 22.5 grams residue was treated with water and precipitated, washed thoroughly, and dried giving 16.6 of a product having a melting range 140–155° with decomposition and 12.4% nitrogen (theory=12.1% nitrogen).

Yield is 96% theory based on dibenzothiazyl disulfide used.

The product obtained from the above reaction consists essentially of:

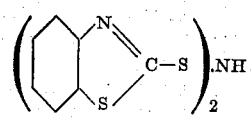

The following rubber mixes were made, vulcanized and tested.

| Stock | C | D |
| --- | --- | --- |
| Pale crepe | 100 | 100 |
| Zinc oxide | 10 | 10 |
| Lithopone | 40 | 40 |
| Whiting | 50 | 50 |
| Suprex clay | 25 | 25 |
| Zinc soap of cocoanut oil acids | 1 | 1 |
| Sulfur | 3 | 3 |
| 1,1'-dithio bis benzothiazole | 0.65 | |
| Accelerator of Example 2 above | | 0.65 |

*Tensiles—unaged*

| Minutes cure at 30 lbs./sq. in. steam pressure | C | | D | |
| --- | --- | --- | --- | --- |
|  | T | E | T | E |
| 10 | 80 | 773 | 200 | 773 |
| 20 | 1,270 | 550 | 1,200 | 506 |
| 30 | 2,000 | 570 | 2,400 | 576 |
| 40 | 2,350 | 583 | 2,600 | 556 |
| 50 | 2,260 | 573 | 2,530 | 563 |

*Tensiles—aged 6 days in oxygen*

| Minutes cure at 30 lbs./sq. in. steam pressure | C | | D | |
| --- | --- | --- | --- | --- |
|  | T | E | T | E |
| 10 | 140 | 565 | 400 | 515 |
| 20 | 1,050 | 485 | 1,150 | 410 |
| 30 | 1,800 | 540 | 2,170 | 530 |
| 40 | 2,000 | 535 | 2,060 | 520 |
| 50 | 1,870 | 540 | 1,500 | 455 |

*Scorch test*

| Minutes cure at 5 lbs./sq. in. steam pressure | C | | D | |
| --- | --- | --- | --- | --- |
|  | T | E | T | E |
| 30 | | | | |
| 45 | | | | |
| 60 | | | | |
| 75 | | | | |
| 90 | 135 | 1,020 | 200 | 972 |
| 105 | 132 | 1,040 | 202 | 972 |
| 120 | 190 | 820 | 200 | 900 |

EXAMPLE III 8.6 grams 1,1'-dithio-bis-benzothiazole (crude) treated with theoretical amount of chlorine and 50 ccs. carbon tetrachloride and the product added gradually with good agitation to 20 ccs. concentrated ammonium hydroxide and 200 ccs. water. The resulting material was boiled to recover carbon tetrachloride used, cooled, precipitated, filtered off, washed and dried, obtaining 6.1 grams of a product having melting range 157–165° with decomposition (83% yield), and having 10.58% nitrogen. Theory for $(C_7H_4NS_2)_3N$ is 10.8% nitrogen.

The product consists essentially of:

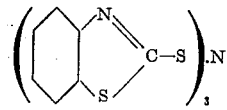

The following rubber mixes were made, vulcanized and tested.

| Stock | E | F |
| --- | --- | --- |
| Pale crepe | 100 | 100 |
| Zinc oxide | 10 | 10 |
| Lithopone | 40 | 40 |
| Whiting | 50 | 50 |
| Suprex clay | 25 | 25 |
| Zinc soap of cocoanut oil acids | 1 | 1 |
| Sulfur | 3 | 3 |
| 1,1'-dithio bis benzothiazole | 0.65 | |
| Reaction product of Example 3 above | | 0.65 |

*Tensiles—unaged*

| Minutes cure at 30 lbs./sq. in. steam pressure | E | | F | |
| --- | --- | --- | --- | --- |
|  | T | E | T | E |
| 20 | 640 | 560 | 450 | 513 |
| 30 | 1,600 | 603 | 1,600 | 590 |
| 45 | 2,240 | 603 | 2,360 | 610 |
| 60 | 2,260 | 600 | 2,370 | 603 |
| 75 | 2,260 | 603 | 2,350 | 700 |

*Tensiles—Aged 168 hours in oxygen*

| Minutes cure at 30 lbs./sq. in. steam pressure | E | | F | |
| --- | --- | --- | --- | --- |
|  | T | E | T | E |
| 20 | 700 | 476 | 700 | 466 |
| 30 | 1,200 | 506 | 1,350 | 516 |
| 45 | 1,600 | 566 | 1,570 | 533 |
| 60 | 1,450 | 533 | 1,200 | 505 |
| 75 | 1,200 | 523 | 630 | 353 |

*Scorch test*

| Minutes cure at 5 lbs./sq. in. steam pressure | E | | F | |
| --- | --- | --- | --- | --- |
|  | T | E | T | E |
| 45 | | | | |
| 60 | | | | |
| 75 | | | | |
| 90 | 102 | 1,170 | 115 | 1,165 |
| 105 | 140 | 730 | 150 | 930 |
| 120 | 162 | 685 | 132 | 752 |
| 135 | 145 | 732 | 145 | 757 |
| 150 | 480 | 490 | 472 | 547 |

EXAMPLE IV

To a mixture of 20 grams 1,1' dithio bis benzothiazole and 100 ccs. carbon tetrachloride was added the theoretical amount of chlorine and this product added to 400 ccs. water, slowly, with strong agitation. Stirred for 2 hours more while heating to drive off solvent which may be condensed and recovered. Finally cooled with stirring and filtered off precipitate, washed and dried. Fifteen grams of nearly white product having a melting range of 161–169° C. The percent nitrogen was 8.14% based on the pure 1,1'-dithio bis benzothiazole (theory is 8.05% nitrogen).

The structure is believed to be:

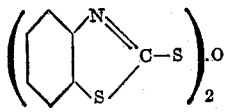

The following rubber stocks were made, vulcanized and tested:

| Stock | G | H |
|---|---|---|
| Pale crepe | 100 | 100 |
| Zinc oxide | 10 | 10 |
| Lithopone | 40 | 40 |
| Whiting | 50 | 50 |
| Suprex clay | 25 | 25 |
| Zinc soap of cocoanut oil acid | 1 | 1 |
| Sulfur | 3 | 3 |
| 1,1'-dithio bis benzothiazole | 0.65 | |
| Accelerator of Example 4 above | | 0.65 |

*Tensiles—unaged*

| Minutes cure at 30 lbs./sq. in. steam pressure | G | | H | |
|---|---|---|---|---|
| | T | E | T | E |
| 10 | 120 | 1,080 | 40 | 1,210 |
| 20 | 820 | 503 | 900 | 470 |
| 30 | 1,970 | 576 | 1,850 | 583 |
| 40 | 2,200 | 590 | 2,200 | 580 |
| 50 | 2,240 | 573 | 2,350 | 566 |

*Tensiles—aged 6 days in oxygen*

| Minutes cure at 30 lbs./sq. in. steam pressure | G | | H | |
|---|---|---|---|---|
| | T | E | T | E |
| 10 | 170 | 610 | 170 | 570 |
| 20 | 770 | 430 | 770 | 446 |
| 30 | 1,760 | 510 | 1,800 | 520 |
| 40 | 1,830 | 530 | 1,970 | 636 |
| 50 | 1,740 | 523 | 1,830 | 523 |

*Scorch test*

| Minutes cure at 5 lbs./sq. in. steam pressure | G | | H | |
|---|---|---|---|---|
| | T | E | T | E |
| 90 | 0 | 1,306 | 0 | 1,320 |
| 105 | 0 | 1,170 | 0 | 1,196 |
| 120 | 0 | 1,103 | 0 | 1,230 |
| 150 | 260 | 642 | 165 | 732 |

EXAMPLE V 16.6 grams 1,1'-dithio bis benzothiazole were stirred with 100 ccs. carbon tetrachloride and theoretical amount of chlorine absorbed. The resulting solution of benzo thiazyl sulfur chloride was added to a solution of 13 ccs. ethylamine in 200 ccs. carbon tetrachloride slowly with agitation. Precipitate forming was filtered off, washed with carbon tetrachloride and dried, recovering 7.8 grams of ethylamine hydrochloride. All carbon tetrachloride filtrates were evaporated to dryness, recovering carbon tetrachloride and leaving 19.1 grams of a product which is a viscous brown oil.

The following rubber stocks were made, vulcanized and tested.

| Stock | I | J |
|---|---|---|
| Pale crepe | 100 | 100 |
| Zinc oxide | 10 | 10 |
| Lithopone | 40 | 40 |
| Whiting | 50 | 50 |
| Suprex clay | 25 | 25 |
| Zinc soap of cocoanut oil acid | 1 | 1 |
| Sulfur | 3 | 3 |
| 1,1'-dithio bis benzothiazole | 0.65 | |
| Accelerator of Example 5 above | | 0.65 |

*Tensiles—unaged*

| Minutes cure at 30 lbs./sq. in. steam pressure | I | | J | |
|---|---|---|---|---|
| | T | E | T | E |
| 20 | (¹) | (¹) | (¹) | (¹) |
| 30 | 1,400 | 613 | 2,390 | 613 |
| 45 | 2,280 | 636 | 2,760 | 606 |
| 60 | 2,200 | 623 | 2,680 | 610 |
| 75 | 2,220 | 626 | 2,540 | 603 |

¹ No cure.

*Tensiles—aged 72 hours at 212° F.*

| Minutes cure at 30 lbs./sq. in. steam pressure | I | | J | |
|---|---|---|---|---|
| | T | E | T | E |
| 20 | (¹) | (¹) | (¹) | (¹) |
| 30 | 1,080 | 520 | 790 | 423 |
| 45 | 860 | 506 | 690 | 336 |
| 60 | 900 | 500 | 750 | 350 |
| 75 | 790 | 470 | 680 | 336 |

¹ No cure.

*Scorch test*

| Minutes cure at 5 lbs./sq. in. steam pressure | I | | J | |
|---|---|---|---|---|
| | T | E | T | E |
| 15 | (¹) | (¹) | (¹) | (¹) |
| 20 | (¹) | (¹) | (¹) | (¹) |
| 30 | (¹) | (¹) | (¹) | (¹) |
| 45 | 55 | 1,443 | 106 | 1,116 |
| 60 | 58 | 1,216 | 133 | 1,090 |
| 75 | 126 | 1,203 | 140 | 1,043 |
| 90 | 156 | 830 | 140 | 1,113 |
| 120 | 530 | 480 | 260 | 580 |

¹ No cure.

EXAMPLE VI

Benzothiazyl sulfur chloride from 16.6 grams 1,1'-dithio bis benzothiazole and 100 ccs. carbon tetrachloride was slowly added to a solution of 23.2 ccs. cyclohexylamine in 100 ccs. carbon tetrachloride. The resulting solution was filtered and washed with carbon tetrachloride and precipitate dried, recovering 13.4 grams cyclohexylamine hydrochloride. The carbon tetrachloride filtrates were evaporated recovering carbon tetrachloride used and a residual oil obtained which crystallized after several days standing to 23.6 grams white powder, melting range 75–90° C. and having 9.79% nitrogen. (Theory is 9.8% nitrogen.) The product is believed to have the general formula

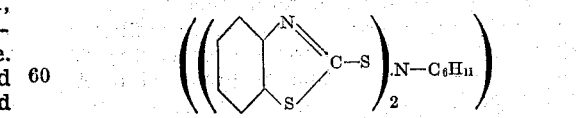

The following rubber stocks were made, vulcanized and tested.

| Stock | K | L | M |
|---|---|---|---|
| Pale crepe | 100 | 100 | 100 |
| Zinc oxide | 10 | 10 | 10 |
| Lithopone | 40 | 40 | 40 |
| Whiting | 50 | 50 | 50 |
| Suprex clay | 25 | 25 | 25 |
| Zinc soap of cocoanut oil acid | 1 | 1 | 1 |
| Sulfur | 3 | 3 | 3 |
| 1,1'-dithio bis benzothiazole | 0.65 | | |
| Accelerator of Example 6 above | | 0.65 | 0.325 |

*Tensiles—unaged*

| Minutes cure at 30 lbs./sq. in. steam pressure | K | | L | | M | |
|---|---|---|---|---|---|---|
| | T | E | T | E | T | E |
| 20 | 720 | 560 | 1,990 | 566 | 880 | 613 |
| 30 | 1,370 | 556 | 2,530 | 603 | 1,210 | 563 |
| 45 | 2,200 | 606 | 2,600 | 606 | 2,080 | 616 |
| 60 | 2,240 | 603 | 2,560 | 603 | 2,230 | 583 |
| 75 | 2,130 | 613 | 2,300 | 596 | 2,120 | 603 |

*Tensiles—72 hours at 212° F.*

| Minutes cure at 30 lbs./sq. in. steam pressure | K | | L | | M | |
|---|---|---|---|---|---|---|
| | T | E | T | E | T | E |
| 20 | 1,400 | 490 | 1,100 | 483 | 610 | 503 |
| 30 | 1,080 | 486 | 1,120 | 470 | 620 | 483 |
| 45 | 1,000 | 450 | 1,020 | 436 | 640 | 443 |
| 60 | 840 | 406 | 960 | 396 | 700 | 413 |
| 75 | 800 | 386 | 960 | 406 | 560 | 353 |

*Scorch test*

| Minutes cure at 5 lbs./sq. in. steam pressure | K | | L | | M | |
|---|---|---|---|---|---|---|
| | T | E | T | E | T | E |
| 90 | 61 | 1,446 | 103 | 856 | 136 | 880 |
| 105 | 61 | 870 | 146 | 616 | 200 | 766 |
| 120 | 330 | 566 | 1,276 | 546 | 513 | 570 |
| 135 | 270 | 583 | 1,573 | 556 | 610 | 620 |
| 150 | 830 | 533 | 1,933 | 536 | 1,093 | 583 |

Example VII

A 15 grams of butylamine were dissolved in 300 ccs. carbon tetrachloride and 20 grams benzo thiazyl sulfur chloride in 150 ccs. carbon tetrachloride were added. The carbon tetrachloride was evaporated and recovered and the residue was taken up in fresh carbon tetrachloride, filtered off precipitate and dried, recovering 11.7 grams butylamine hydrochloride. The carbon tetrachloride filtrates were evaporated to dryness, recovering carbon tetrachloride and leaving 18.9 grams of a viscous oil having some 10.7% nitrogen (theory for $(C_7H_4NS_2)NHC_4H_9 = 11.8$ and for $(C_7H_4NS_2)_2NC_4H_9 = 10.4\%$ nitrogen).

B 20 grams 1,1'-dithio bis benzothiazole and 100 ccs. dry benzene were treated with theoretical amount of chlorine and the resulting solution of benzo thiazyl sulfur chloride was added slowly to 18 grams butylamine in 200 ccs. benzene with stirring. The resulting material was filtered to remove butylamine hydrochloride and the filtrate evaporated recovering benzene and leaving 28 grams of the same product as produced in A, as thick paste.

The following rubber stocks were made, vulcanized and tested.

| Stock | N | O | P |
|---|---|---|---|
| Pale crepe | 100 | 100 | 100 |
| Zinc oxide | 10 | 10 | 10 |
| Lithopone | 40 | 40 | 40 |
| Whiting | 50 | 50 | 50 |
| Surpex clay | 25 | 25 | 25 |
| Zinc soap of cocoanut oil acid | 1 | 1 | 1 |
| Sulfur | 3 | 3 | 3 |
| 1,1'-dithio bis benzothiazole | 0.65 | | |
| The accelerator of Example 7 (A) above | | 0.65 | 0.325 |

*Tensiles—unaged*

| Minutes cure at 30 lbs./sq. in. steam pressure | N | | O | | P | |
|---|---|---|---|---|---|---|
| | T | E | T | E | T | E |
| 10 | 220 | 960 | 240 | 763 | 400 | 850 |
| 20 | 1,200 | 485 | 1,620 | 506 | 1,000 | 503 |
| 30 | 2,200 | 570 | 2,760 | 570 | 1,830 | 545 |
| 40 | 2,400 | 550 | 2,840 | 593 | 2,400 | 573 |
| 50 | 2,400 | 573 | 2,600 | 543 | 2,540 | 560 |

*Tensiles—aged 5 days in oxygen*

| Minutes cure at 30 lbs./sq. in. steam pressure | N | | O | | P | |
|---|---|---|---|---|---|---|
| | T | E | T | E | T | E |
| 10 | 230 | 625 | 230 | 535 | 250 | 535 |
| 20 | 870 | 470 | 1,360 | 455 | 800 | 440 |
| 30 | 2,000 | 550 | 2,370 | 545 | 1,360 | 490 |
| 40 | 2,250 | 535 | 2,000 | 500 | 1,740 | 535 |
| 50 | 2,050 | 525 | 1,730 | 490 | 1,660 | 525 |

*Scorch test*

| Minutes cure at 5 lbs./sq. in. steam pressure | N | | O | | P | |
|---|---|---|---|---|---|---|
| | T | E | T | E | T | E |
| 30 | | | | | | |
| 45 | | | | | | |
| 60 | 130 | 1,222 | 130 | 1,160 | 195 | 1,062 |
| 75 | 137 | 1,250 | 145 | 1,115 | 180 | 1,025 |
| 90 | 130 | 1,160 | 147 | 1,057 | 180 | 1,015 |
| 105 | 197 | 992 | 180 | 857 | 230 | 827 |

Examples of other arylamines that may be reacted with benzothiazyl sulfur chloride, for purposes of the invention, are alpha naphthylamine, and beta-naphthylamine, giving corresponding N-naphthyl benzothiazyl sulfamines of the character herein disclosed.

When an alcohol (or alcoholate), or phenol (or phenolate) is reacted with the arylene-thiazyl sulfur chloride, compounds of the type of benzothiazyl ethoxy sulfide, and benzothiazyl phenoxy sulfide are produced, the O-alkyl or O-aryl group being joined to the thiol sulfur atom.

The invention may be applied to the vulcanization of natural rubbers as well as artificially prepared rubbers adaptable to vulcanization with sulfur, including reclaims and latices of such rubber compositions.

The present invention is not limited to the specific examples above set forth wherein the preferred accelerators are employed. Other ratios of the compounding ingredients than those mentioned in the examples as well as other well known fillers, pigments and the like may be employed in the production of various types of rubber compounds as will be apparent to those skilled in the art to which this invention pertains.

Having thus described my invention, what I claim and desire to protect by Letters Patent is:

1. A method which comprises vulcanizing rubber in the presence of a compound of the general formula

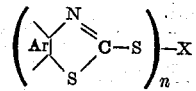

where Ar is an arylene group; $n$ is 3, and X is nitrogen.

2. A method which comprises vulcanizing rubber in the presence of an N-aryl mono-benzothiazyl sulfamine.

3. The vulcanization product of a rubber composition containing a compound as set forth in claim 1.

4. A method which comprises vulcanizing rubber in the presence of an arylene thiazyl sulfamine selected from the group consisting of compounds having the respective formulas:

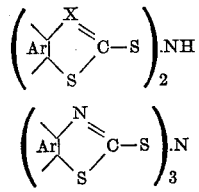

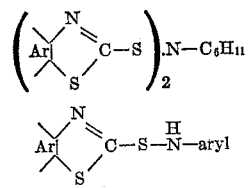

where Ar is an arylene group.

5. The vulcanization product of a vulcanizable rubber composition containing a product of reaction as set forth in claim 4.

WILLIAM E. MESSER.